United States Patent [19]

Boram et al.

[11] Patent Number: 5,098,801
[45] Date of Patent: Mar. 24, 1992

[54] BIPOLAR BATTERY AND ASSEMBLY METHOD

[75] Inventors: Mark E. Boram, Anderson; Roy D. Parrish, Chesterfield, both of Ind.

[73] Assignee: General Motors Corporation, Detroit, Mich.

[21] Appl. No.: 581,000

[22] Filed: Sep. 12, 1990

[51] Int. Cl.$^5$ .............................. H01M 10/18
[52] U.S. Cl. .................... 429/160; 429/185; 29/623.2
[58] Field of Search ............... 429/158, 159, 160, 185; 29/623.2

[56] References Cited

U.S. PATENT DOCUMENTS

| | | | |
|---|---|---|---|
| 3,167,456 | 1/1965 | Schilke et al. | 136/10 |
| 3,692,587 | 9/1972 | Vetor et al. | 136/134 R |
| 4,504,556 | 3/1985 | Pearson | 429/136 |
| 4,525,438 | 6/1985 | Pearson | 429/149 |
| 4,777,101 | 10/1988 | Blomberg et al. | 429/129 |

FOREIGN PATENT DOCUMENTS 2070844A 9/1981 United Kingdom .

*Primary Examiner*—Karl Group
*Attorney, Agent, or Firm*—Lawrence B. Plant

[57] ABSTRACT

Bipolar battery and method of making intercell connection between adjacent cells involving use of an elastomeric collar on the links joining bipolar electrode halves compressing the collars in an opening between adjacent cell compartments and injecting a sealant about the collar to seal off the opening.

8 Claims, 3 Drawing Sheets

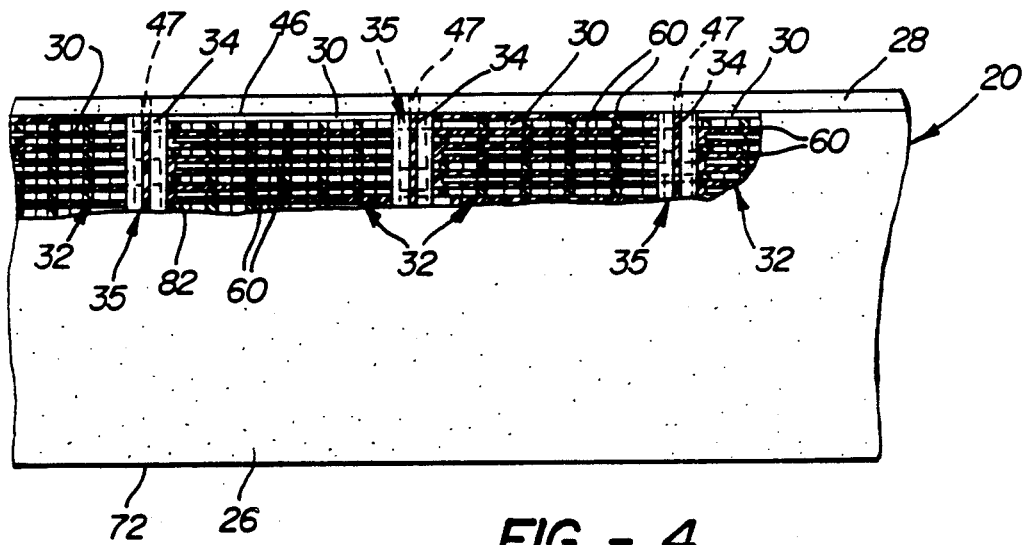
FIG - 4
FIG - 5
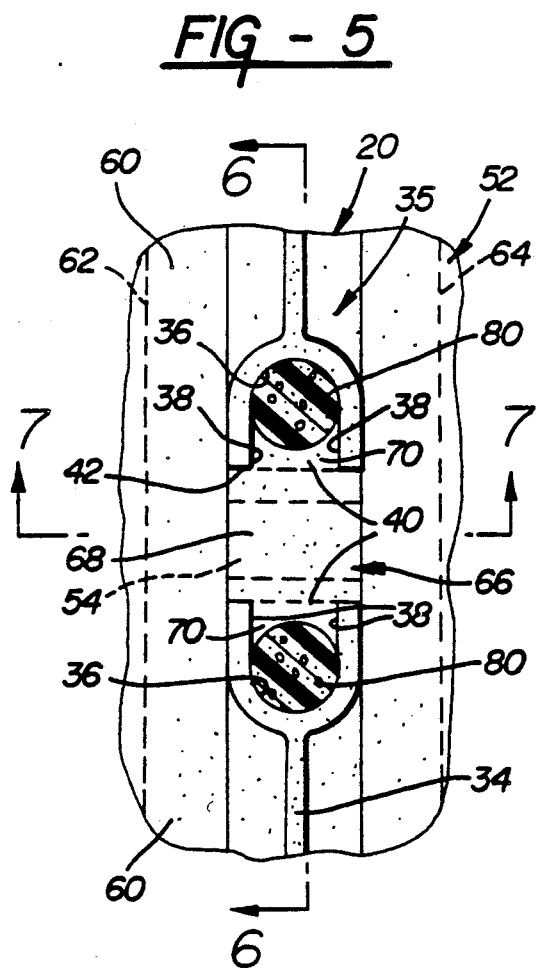
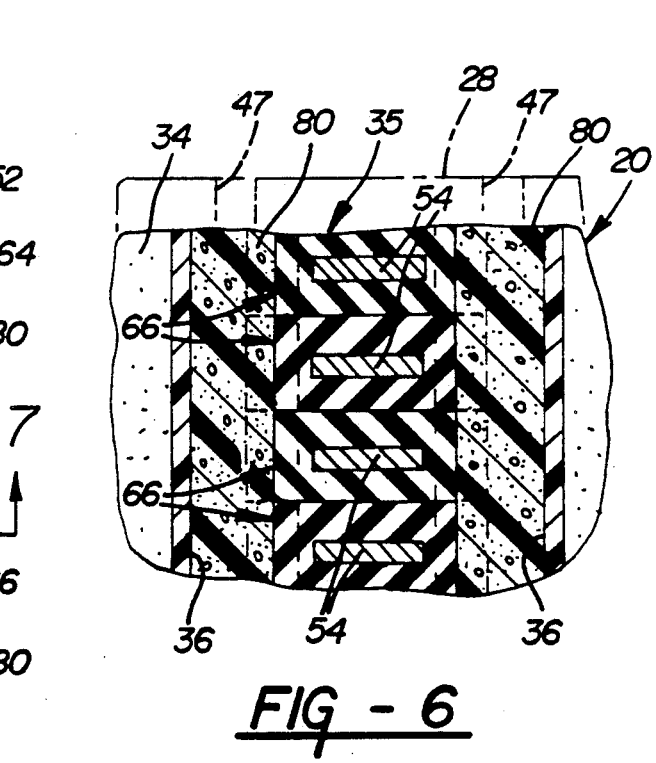
FIG - 6

BIPOLAR BATTERY AND ASSEMBLY METHOD

This invention relates to multicell, bipolar batteries and a method of making same, and more particularly to means/method for preventing electrolyte leakage between adjacent cells thereof.

BACKGROUND OF THE INVENTION

Bipolar batteries employ either one of two general types of bipolar electrodes The first, or "face-to-face" type of bipolar electrode, utilizes an electrolyte impervious, conductive sheet having a first polarity, electrochemically active material applied (e.g., pasted) onto one face of the sheet and an opposite polarity, electrochemically active material applied to the opposite face of the sheet. These electrodes are stacked in the battery such that the opposite polarity faces of adjacent electrodes oppose each other across an electrolyte-filled gap, and are separated one from the other by an electrolyte-permeable separator. The second, or "side-by-side", type of bipolar electrode comprises an electrically conductive substrate (e.g., a grid work of conductive wires) having two separate, substantially coplanar, side-by-side electrode portions (hereafter plates) thereon each of which contains an electrochemically active material of opposite polarity to the other. The two opposite polarity plates are electrically connected to each other by an electrically conductive link which comprises a central segment of the shared conductive substrate which is free of electrochemically active material and lies intermediate the two opposite polarity plates and in essentially the same plane as the plates. Such side-by-side bipolar electrodes, and a multicell primary battery made therefrom, are described in Schilke et al U.S. Pat. No. 3,167,456, assigned to the assignee of the present invention. Schilke et al's, side-by-side bipolar electrodes are arranged in overlapping fashion so as to form a plurality of cell elements each housed in a separate cell compartment of a container and comprising a stack of the positive and negative polarity plates of different bipolar electrodes alternately interleaved one with the other. The bipolar electrodes are arranged such that the first polarity plate of each bipolar electrode resides in one compartment and the opposite polarity plate of the same bipolar electrode resides in an adjacent cell compartment in the fashion depicted in FIG. 1 hereof. The electrochemically neutral center segment of Schilke et al's conductive grid electrically links the opposite polarity plates together from one cell to the next. Several such links stacked together between adjacent compartments form the battery's intercell connector and serve to electrically series connect the several cell elements together.

OBJECTS OF THE INVENTION

The present invention relates to improvements to Schilke et al-type multicell bipolar batteries using "side-by-side" bipolar electrodes as applied to secondary batteries and particularly recombinant Pb-acid batteries. It is an object of the present invention to provide secondary, Schilke et al-type, multicell, bipolar batteries with an improved electrolyte barrier between adjacent cell compartments, and a method of making same, which substantially prevents electrolyte leakage between adjacent cells thereby preventing self discharge and increasing both the shelf and operating lives of the battery. This and other objects and advantages of the present invention will become more apparent from the description thereof which follows.

BRIEF DESCRIPTION OF THE INVENTION

The invention comprehends a multicell electric storage battery, and method of making same, and more particularly a means/method, for preventing leakage of electrolyte between adjacent cell compartments in Schilke et al-type, secondary, batteries having side-by-side bipolar electrodes. The battery will preferably be a gas recombinant Pb-acid battery wherein oxygen generated at one plate moves across the interelectrode gap through a fibrous mat to an opposite polarity plate and recombines with hydrogen generated thereat. The battery comprises a container having a plurality of walls defining a plurality of individual cell compartments wherein one of the walls is an intercell partition separating one cell compartment from the next. The partition includes a section, preferably near the center thereof, which is thicker than the remainder of the partition and adapted to receive the battery's intercell connector. A galvanic cell element is positioned in each of the cell compartments and comprises a stack of positive and negative polarity plates alternately interleaved one with the other and separated one from the other by an electrolyte permeable separator. An opening or passage is provided through the thicker section of the partition through which the cell elements in adjacent compartments are electrically connected, which opening is flanked by a pair of pockets formed in the thick section and having mouths confronting the opening. A unique means/method for substantially isolating adjacent cell compartments one from the other so as to substantially prevent electrolyte leakage therebetween via the intercell connector passage is provided. More specifically, intercell connector means are provided for electrically series connecting adjacent cell elements together through the opening between adjacent cell compartments, which intercell connector means comprises a plurality of electrically conductive links stacked in the opening between the compartments wherein each link joins a pair of coplanar opposite polarity plates into a side-by-side bipolar electrode. The several bipolar electrodes are arranged and positioned in the container, ala Schilke et al, such that the conductive link joining the opposite polarity plates of each bipolar electrode is substantially aligned with other similar links for other such electrodes within the opening in the intercell partition between the compartments. The intercell connector will preferably include a border extending along the edge of each plate adjacent the opening in the intercell partition for collecting current from the plate and conducting it to the link. Each link has an elastomeric collar closely fitted thereabout. The collar is aligned and stacked with similar collars on other links in the opening and together therewith substantially fills the opening in the partition. The height of the stacked collars exceeds the depth of the opening (i.e., top to bottom) such that when a cover is placed on the container, the stack of collars are longitudinally compressed causing them to deform laterally and seal closed the mouths of the pockets flanking the opening. Thereafter sealant is injected through apertures in the cover into the pockets flanking the opening under sufficient pressure as to laterally hydraulically compress the collars In accordance with one embodiment of the invention, the collar comprises a central portion engaging the link and otherwise substantially filling the cross section of the opening and having a pair of laterally projecting wings extending into the pockets flanking the opening. Injection of the sealant causes the wings to deform into tight sealing engagement with the sidewalls of the pocket. In a most preferred embodiment, the distal ends of the wing portions are bifurcated so as to provide a pair of prongs or branches which lie contiguous the sidewalls defining the pocket. Injection of the sealant presses the branches into sealing engagement with the sidewalls of the pocket.

The bipolar electrodes are alternately stacked in the container in such a manner as to: (1) constitute the individual cell element stacks; (2) align the intercell connector links one with the other in the opening; and (3) cause the collars on each bipolar electrode to be aligned and abut one another in the opening in the partition. After stacking of the electrodes in the container, a cover is positioned thereon so as to longitudinally compress the collars sufficiently to laterally expand them so as to plug the mouths of the pockets and prevent escape of sealant therefrom. The cover has apertures thereon aligned with the pockets. Liquid sealant (e.g., an uncured thermosetting resin or a heated thermoplastic resin capable of bonding to the pocket sidewalls and the collar) is injected into the pockets under sufficient pressure to laterally deform the collars and compress them tighter about their associated links. The collars will preferably comprise a polyolefin-based thermoplastic elastomer such as Santoprene ® or Kraton ® available commercially from Monsanto Chemical Co or Shell Chemical Co., respectively. The sealant will preferably comprise a high melt flow polypropylene or polybutylene which bonds well with the polypropylene container and the polyolefin-based collar material. Alternatively, uncured epoxy may be injected into the pockets which, upon hardening, bonds to the pocket sidewalls as well as to the collars. Silicone rubber may also be used. The sealant will preferably be auto-expandable (e.g., include a blowing agent) for causing the sealant to swell within the pockets after it is injected therein to more effectively fill any voids therein and exert compressive force on the elastomeric collar.

The bipolar battery of the present invention will preferably be of the so-called gas-recombinant type wherein a bibulous, fibrous mat is positioned between the plates on both sides of the opening for absorbing and substantially immobilizing the battery's electrolyte while permitting oxygen transport between adjacent plates in the same element The mat will preferably comprise glass microfibers such as are well known in the art for use in gas-recombinant batteries. One such glass mat material is commercially available in a variety of grades from the Hollingsworth & Vose Company under the trade name Hovosorb ®. However, other fibrous mats made from polyolefins or other polymer fibers effective to immobilize the electrolyte and permit oxygen transport therethrough are also useful. One such Dynel ® or polypropylene mat useful for this purpose is described in Corbin et al U.S. Pat. No. 3,553,020 assigned to the assignee of the present invention.

DETAILED DESCRIPTION OF THE SPECIFIC EMBODIMENTS OF THE INVENTION

The invention will better be understood when considered in the light of the following detailed description of certain specific embodiments thereof which is given hereafter in conjunction with the several drawings in which:

FIG. 4 is a partially broken away and sectioned view of a bipolar battery in accordance with one embodiment of the present invention;

FIG. 5 is an enlarged view of the circled portion of FIG. 3;

FIG. 6 is a view in the direction 6—6 of FIG. 5;

Figure 1:
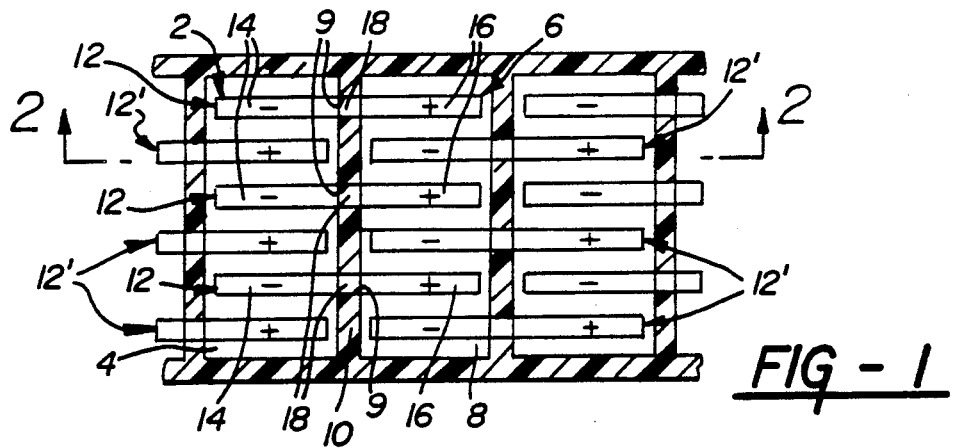
FIG. 1 is a schematic, sectioned view illustrating a multicell bipolar battery having side-by-side bipolar electrodes.
Figure 2:
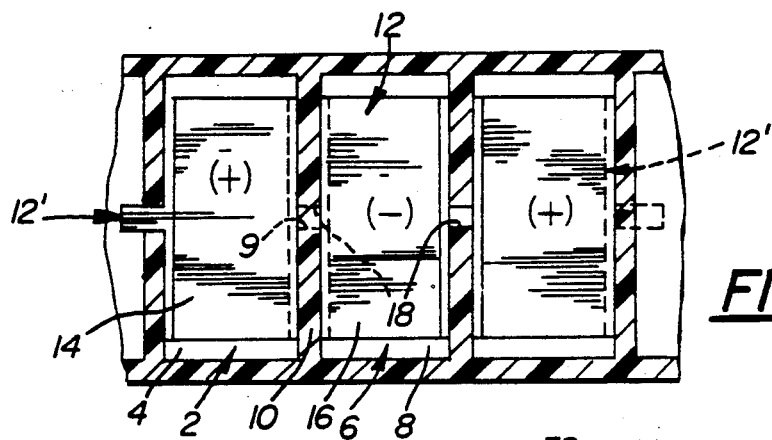
FIG. 2 is a view in the direction 2—2 of FIG. 1.
Figure 8:
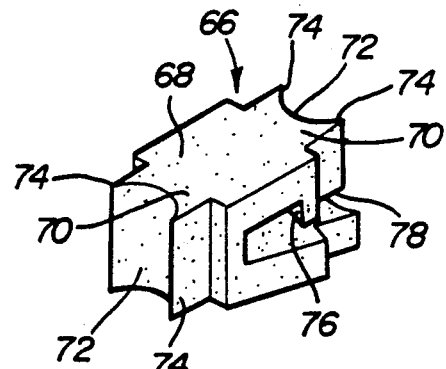
Figure 9:
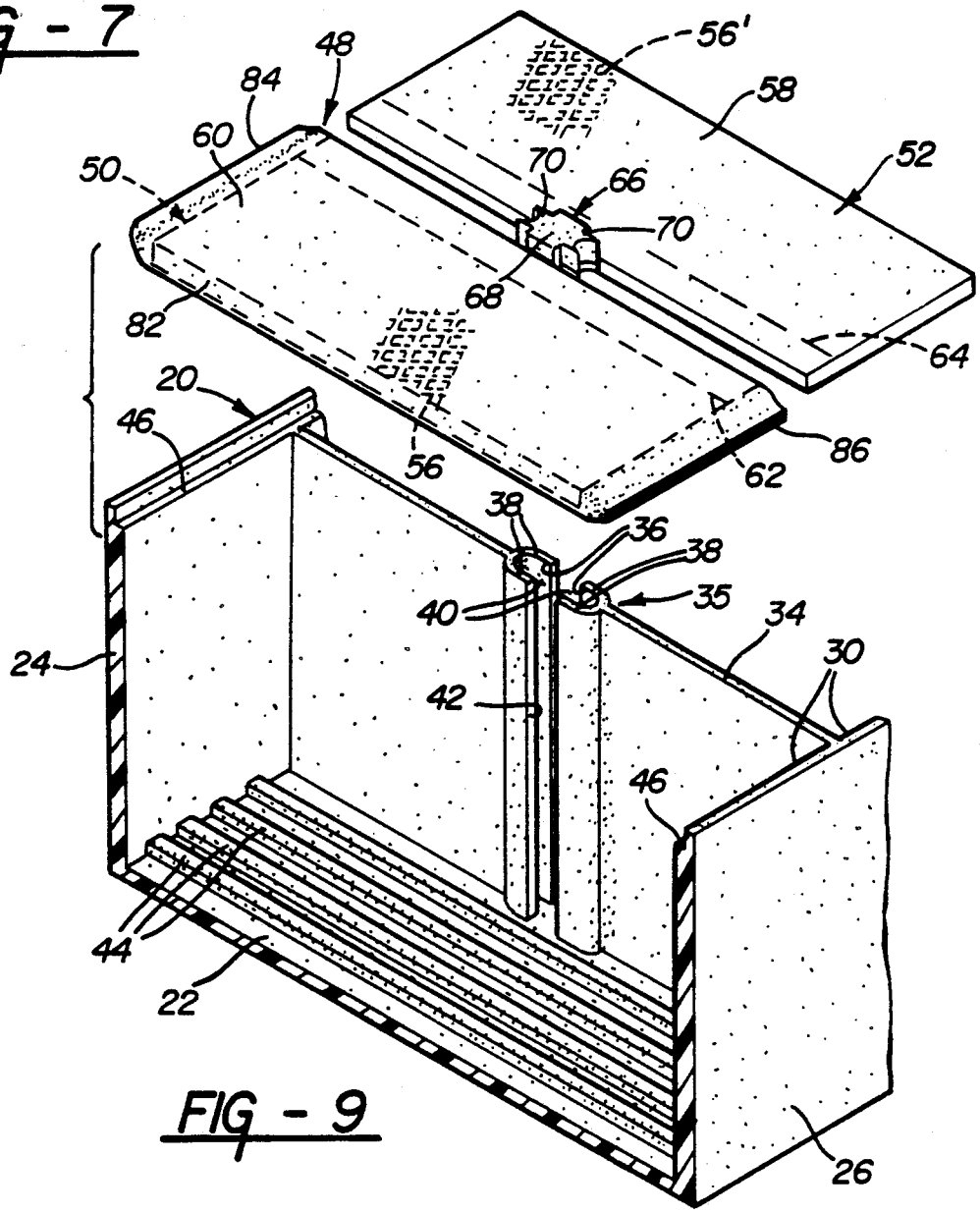

FIG. 8 is a perspective view of a preferred collar in accordance with the present invention; and FIG. 9 is an exploded perspective view showing how the bipolar electrodes are stacked in the container in accordance with the present invention FIGS. 1 and 2 illustrate a multicell bipolar battery of the side-by-side bipolar electrode type having a first cell element 2 in container compartment 4, a second cell element 6 in container compartment 8 and an intercell partition 10 separating the compartments 4 and 8 each from the other. Bipolar electrodes 12 comprise a negative polarity plate portion 14 and a positive polarity plate portion 16 each in separate compartments 4 and 8 respectively of the container and electrically joined one to the other by an electrically conductive link 18 sealingly passing through opening 9 in the partition 10. The several bipolar electrodes 12 are interleaved with similar electrodes 12' which are alternately oriented 180° to each other such that in each cell element the negative plate portion of one bipolar electrode lies face-to-face with the positive plate portion of an adjacent bipolar electrode.

Figure 3:
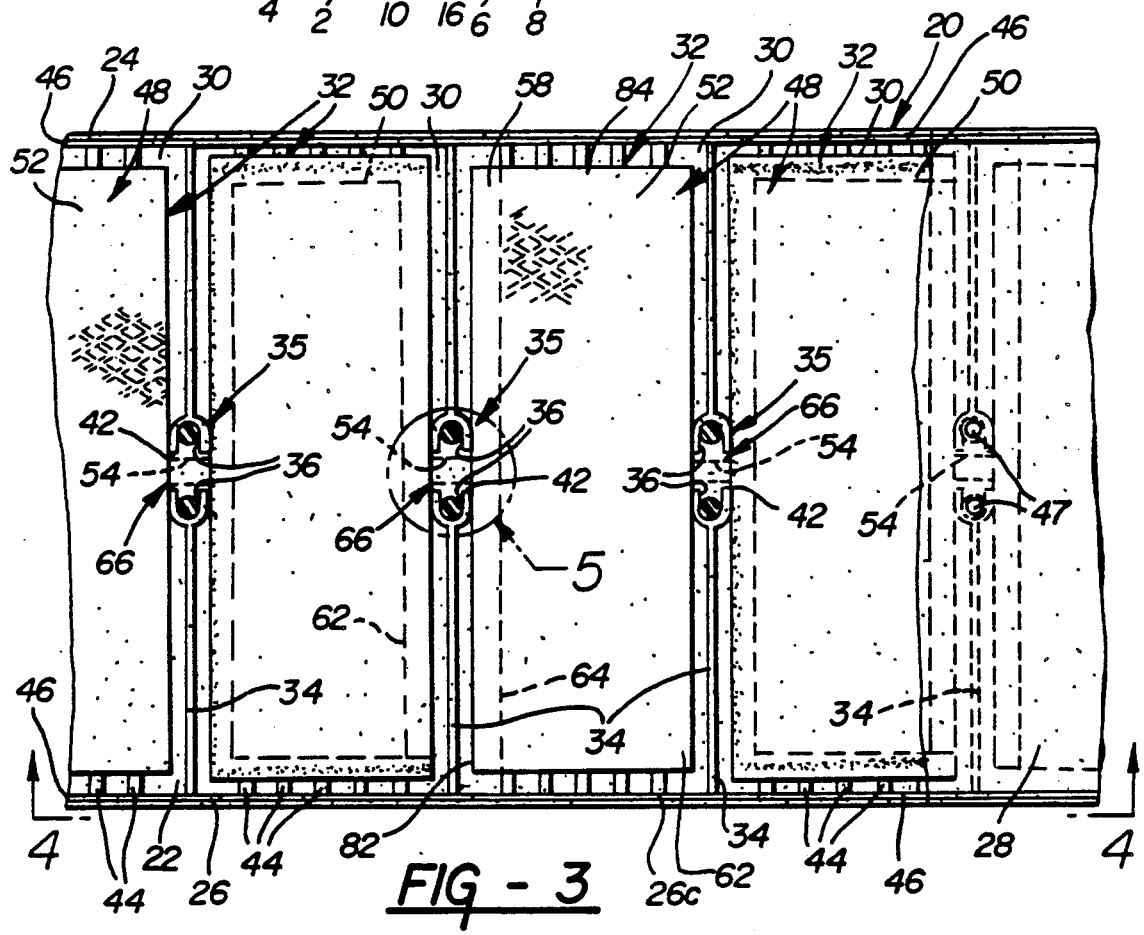
FIG. 3 is a plan view of a partially open container (i.e., sans cover) housing bipolar electrodes and intercell connector seals in accordance with the present invention.

FIGS. 3, 4 and 9 show a container 20 comprising a bottom wall 22, side walls 24 and 26 and having a cover 28 which forms the top wall of the container 20. The container 20 defines a plurality of compartments 30 each adapted to receive an individual cell element 32 and separated one from the other by an intercell partition 34. The partition 34 includes a thickened section 35 having pockets 36 therein flanking an intercell opening 42 and defined by opposing sidewalls 38. The pockets 36 have, mouths 40 confronting the opening 42 lying therebetween. Ribs 44 extend along the bottom wall 22 and support the element 32 off the floor of the container. The cover 28 is adapted to mate with the shoulders 46 on the walls 24 and 26 of container 20 and is bonded thereto as by heat sealing, adhesives or otherwise. The cover 28 includes a plurality of holes 47 therethrough which are aligned with the pockets 36 in the thickened partition section 35 to permit injection of sealant therein after the cover 28 has been placed on, and sealed to, the container 20.

A bipolar electrode 48 has a positive plate portion 50 and a negative plate portion 52 electrically interconnected one to the other by an electrically conductive link 54. More specifically, the bipolar electrode 48 includes a common conductive substrate comprising grid wires 56 and pasted with electrochemically active material 58. The positive plate 50 of the bipolar electrode 48 is sheathed in an envelope 60 of microporous battery separator material (e.g., microporous polyethylene) and the several electrodes 50 and 52, in a given stack thereof, are separated one from the other by a bibulous electrolyte-absorbent, fibrous mat (not shown) such as, for example, may comprise glass and is commonly found in gas-recombinant type batteries Each bipolar electrode 48 shares a common conductive substrate comprising a plurality of interconnecting grid wires 56 extending from a current collecting border 62 on the positive plate side and grid wires 56' extending from current, collecting border 64 on the negative plate side of the bipolar electrode 48. The link 54 joins the respective current collecting borders 62 and 64.

Figure 7:
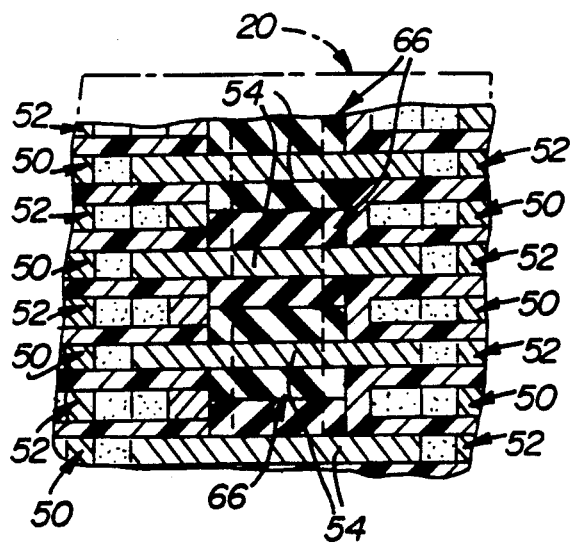
FIG. 7 is a view in the direction 7—7 of FIG. 5.

An elastomeric collar 66 (see FIG. 8) is positioned snugly about each link 54 and is adapted to fit within the opening 42 in the thickened section 35 of the partition 34. The collar 66 will preferably comprise a center portion 68 which substantially fills the opening 42 and a pair of laterally extending wing portions 70 projecting outwardly from the center portion 68 and adapted to fit within the opposing pockets 36 as best shown in FIGS. 5-7. The distal ends 72 of the wings 70 are each bifurcated so as to provide a pair of prongs 74 adapted to lie adjacent the sidewalls 38 defining the pockets 36 as will be discussed in more detail hereinafter. The center portion 68 includes an opening 76 therethrough sized to snugly receive a link 54, and is split open at the cut 78 to permit positioning of the collar 66 onto the link 54. The collar preferably comprises a polyolefin-based thermoplastic elastomer (e.g., Santoprene® or Kraton®) which bonds well to the sealant with which it subsequently comes into contact During assembly, the several bipolar electrodes 48 are stacked (see FIG. 9) in the battery container in the manner described in connection with FIGS. 1 and 2 and such that the collar 66 on adjacent bipolar electrode links 54 abut one another in the opening 42 so as to space the several bipolar electrodes 48 apart and provide a barrier to the outflow of sealant injected into the pockets 36 flanking the collars 66. The center portions 68 of the several collars 66 substantially fill the cross-section of the opening 42 and the wings extend into the mouths 40 of the flanking pockets 36. The height of the column of collars is initially somewhat higher than the height of the opening 36, and upon the application of longitudinal force to the column, causes the stack to compress and expand laterally into tight engagement with the mouths 40 of the pockets sufficient to prevent leakage of sealant from the pockets 36 during subsequent injection of sealant thereinto.

After the bipolar electrodes 48 have been assembled in the manner described above, the cover 28 is pressed onto the container 20 so as to longitudinally compress the collars 66 and laterally expand them so as to plug the mouths 40 of the pockets 36. Liquid sealant 80 is then injected into the pockets 36 through the apertures 47 provided in the cover 28. The liquid sealant will preferably comprise a high melt flow polypropylene or polybutylene for bonding to both the collar and the sidewalls 38. Alternatively, the sealant may remain flexible throughout its life and accordingly may comprise an electrolyte resistant elastomeric material such as silicon rubber which is injected into the opening as a liquid before curing to an elastic state. The sealant may also include a blowing agent or the like which causes the sealant to swell or expand after injection so as to insure complete filling of the region between the bars and the recesses at the ends of the opening. Such blowing agents result in the formation of a porous sealant characterized by a multitude of small closed-cell pores distributed throughout. The sealant is injected into the pockets 36 under sufficient pressure to further compress the wing portions 70 an expand them laterally into tight engagement with the sidewalls 38. At the same time the sealant spreads the prongs 74 apart and presses them tightly against the sidewalls 38.

The sealant 80 is preferably injected into the pockets 36 after the cover 28 has been secured to the container 20 and by inserting a nozzle(s) (not shown) through the holes 47 in the cover 28 and down to near the bottom wall 22 of the container 20. At that time, the sealant is injected into the pocket(s) 36 and the nozzle(s) are slowly withdrawn from the pocket(s) at a rate commensurate with the rate at which the sealant is dispensed into the pocket(s) and so that all air is displaced from the pocket(s) ahead of the moving front of sealant and out through the holes 47 in the cover 28. Alternatively, the sealant can be injected directed through the apertures 47. In this mode, the air displaced by the sealant escapes around the collar into the compartments on either side of the opening 42. The sealant will preferably comprise a hardenable, high strength material (e.g., high melt flow polyolefin) which, upon solidification, further serves to anchor the cover 28 in place.

A microporous separator 60 sheathes the positive plate 50 of each bipolar, electrode 48 and takes the form of an envelope formed by folding a sheet of the separator material along the centerline 82 (see FIGS. 4 and 9) and bonding (e.g., heat sealing) the lateral edges 84 and 86 to themselves outboard the edges of the plate 50. The several plates will preferably be separated one from the other by a porous fibrous glass mat which absorbs the electrolyte while still permitting $O_2$ transport thereacross to the opposite electrode for reaction thereat and so as to provide a gas-recombinant battery.

While the invention has been disclosed primarily in terms of specific embodiments thereof it is not intended to be limited thereto but rather only to the extent set forth hereafter in the claims which follows.

The embodiments of the invention in which an exclusive property or privilege is claimed are defined as follows:

1. A method of making a multicell electric storage battery having a container comprising a plurality of walls defining a plurality of individual cell compartments, one of said walls being an intercell partition separating one cell compartment from the next and having a section which is thicker than the remainder of said partition and adapted to received an intercell connector means, a galvanic, cell element in each of said compartments comprising a stack of positive and negative polarity plates alternately interleaved one with the other and separated one from the other by an electrolyte permeable separator, an opening through said section of said partition providing a passage between adjacent cell compartments for electrically coupling said cell elements in said adjacent compartments, and intercell connector means electrically series connecting adjacent said cell elements together through said opening and comprising a plurality of electrically conductive links each joining a pair of substantially coplanar, opposite polarity plates into a bipolar electrode in which a positive polarity plate of a first cell element in one cell compartment is connected directly to a negative polarity plate in a second cell element in an adjacent cell compartment comprising the steps of:

forming a pair of pockets in said section on opposite sides of said opening, said pockets being defined by opposing sidewalls and having a mouth confronting said opening;

positioning an elastomeric collar in close fitting relation about each of said links, stacking said bipolar electrodes and their associated collars in said container so as to form said cell elements in said compartments and to cause the collar for each bipolar electrode to align with other similar collars in the opening and therein to abut the collar(s) on the next adjacent bipolar electrode(s) in the stack and together therewith substantially fill the opening in the partition;

positioning a cover onto said container while longitudinally compressing the stack of collars in said opening to deform said collars laterally so as to substantially seal closed the mouth of each said pocket; and injecting sealant into each of said pockets so as to (1) fill said pockets, (2) laterally hydraulically compress said collars more tightly about said links and (3) bond to said collar and container so as to form a substantially electrolyte-tight barrier between said adjacent compartments.

2. A method according to claim 1 wherein said collar has a center portion engaging said link and a pair of wing portions projecting laterally from said center portion into said pockets, and said injecting deforms said wings into sealing engagement with said sidewalls.

3. A method according to claim 2 wherein the distal ends of said wing portions remote from said center portion are each bifurcated so as to provide a pair of prongs lying adjacent said sidewalls and said injecting spreads and presses said prongs into sealing engagement with said sidewalls.

4. A method according to claim 2 wherein said container comprises polypropylene, said collar comprises a polyolefin-based thermoplastic elastomer and said sealant comprises a polyolefin selected from the group consisting of high melt flow polypropylene and high melt flow polybutylene.

5. A method according to claim 4 wherein said sealant is auto-expandable and expands during said injecting.

6. A bipolar, multicell electric storage battery having a container comprising a plurality of walls defining a plurality of individual cell compartments, one of said walls being an intercell partition separating one cell compartment from the next and having a section which is thicker than the remainder of said partition and adapted to receive an intercell connector means, a galvanic cell element in each of said compartments comprising a stack of positive and negative polarity plates alternately interleaved one with the other and separated one from the other by an electrolyte permeable separator, a passage through said section between adjacent cell compartments, a pair of pockets in said section flanking said passage, said pockets each being defined by a pair of opposing sidewalls, intercell connector means electrically series connecting adjacent said cell elements together through said passage and comprising a plurality of electrically conductive links each joining a pair of substantially coplanar, opposite polarity plates into a bipolar electrode in which the positive polarity plate of the bipolar electrode is located in a first cell element in one cell compartment and the negative polarity plate of the electrode is located in a second cell element in an adjacent cell compartment, an elastomeric collar sealingly compressed about each said link, each said collar being stacked together between said pockets with other collars for other links, and sealant filling said pockets, compressing said collars and bonded to said collars and said sidewalls for preventing electrolyte leakage between adjacent cell compartments via said passage.

7. A battery according to claim 6 wherein said collar includes a center portion engaging said link and a pair of wing portions projecting laterally from said center portion into said pockets.

8. A battery according to claim 6 wherein the distal ends of said wing portions remote from said center portion are each bifurcated so as to provide a pair of prongs which are pressed into sealing engagement with said sidewalls by said sealant.

* * * * *